United States Patent
O'Neill et al.

(10) Patent No.: US 12,263,524 B2
(45) Date of Patent: Apr. 1, 2025

(54) LASER ARRAY FOR LASER POWDER BED FUSION PROCESSING OF METAL ALLOYS

(71) Applicant: The Boeing Company, Arlington, VA (US)

(72) Inventors: William O'Neill, Cambridge (GB); Martin Sparkes, Hertfordshire (GB); Andrew Timothy Payne, Cambridge (GB); Patrick Jerome Kiley, Cambridge (GB); Diego Punin, Cambridge (GB)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/598,658

(22) Filed: Mar. 7, 2024

(65) Prior Publication Data

US 2024/0207934 A1   Jun. 27, 2024

Related U.S. Application Data

(62) Division of application No. 16/943,930, filed on Jul. 30, 2020, now Pat. No. 11,964,324.

(51) Int. Cl.
*B22F 10/00* (2021.01)
*B22F 3/10* (2006.01)
(Continued)

(52) U.S. Cl.
CPC ............ *B22F 10/00* (2021.01); *B22F 3/1017* (2013.01); *B22F 10/10* (2021.01); *B22F 10/28* (2021.01);
(Continued)

(58) Field of Classification Search
CPC ........ B22F 10/00; B22F 3/1017; B22F 10/10; B22F 12/45; B22F 12/47; B22F 10/364;
(Continued)

(56) References Cited

U.S. PATENT DOCUMENTS

2017/0021455 A1\* 1/2017 Dallarosa ................ B22F 12/41
2018/0229444 A1 8/2018 Karp et al.
2018/0345382 A1 12/2018 Roychowdhury et al.

FOREIGN PATENT DOCUMENTS

EP          3202514 A1    8/2017
EP          3345698 A1    7/2018
WO       2019034259 A1    2/2019

OTHER PUBLICATIONS

Extended European Search Report, Application No. 21173502.2, mailed Aug. 2, 2021, 9 pages.

(Continued)

*Primary Examiner* — Ricardo D Morales
(74) *Attorney, Agent, or Firm* — Walters & Wasylyna LLC

(57) ABSTRACT

Systems and methods additively manufacturing an object by applying heat to a first plurality of metallic particles in a powder bed using a first heat source, wherein the first heat source is one of multiple heat sources configured into an array, and the first heat source generates a first melt pool. Heat is simultaneously applied to a second plurality of metallic particles in the powder bed using a second heat source of the multiple heat sources in the array to generate a second melt pool. The first plurality of metallic particles are separated from the second plurality of metallic particles by a distance, wherein the distance and an amount of heat from each heat source is controlled to generate a combined melt pool that is larger in size and encompasses the first and second melt pools. The combined melt pool is allowed to solidify to form the object.

20 Claims, 9 Drawing Sheets

(51) Int. Cl.
  *B22F 10/10* (2021.01)
  *B22F 10/28* (2021.01)
  *B22F 10/364* (2021.01)
  *B22F 12/45* (2021.01)
  *B22F 12/47* (2021.01)
  *B33Y 10/00* (2015.01)
  *B33Y 30/00* (2015.01)
  *B33Y 50/02* (2015.01)

(52) U.S. Cl.
  CPC ............ *B22F 10/364* (2021.01); *B22F 12/45* (2021.01); *B22F 12/47* (2021.01); *B22F 2202/11* (2013.01); *B22F 2203/11* (2013.01); *B22F 2301/205* (2013.01); *B33Y 10/00* (2014.12); *B33Y 30/00* (2014.12); *B33Y 50/02* (2014.12)

(58) Field of Classification Search
  CPC .. B22F 10/28; B22F 2202/11; B22F 2203/11; B22F 2301/205; B33Y 10/00; B33Y 30/00; B33Y 50/02
  See application file for complete search history.

(56) References Cited

OTHER PUBLICATIONS

Office Action, EP Application No. 21173502.2, dated Jan. 5, 2024, 6 pages.

\* cited by examiner

LASER ARRAY FOR LASER POWDER BED FUSION PROCESSING OF METAL ALLOYS

CROSS REFERENCE TO RELATED APPLICATIONS

This application is a Divisional of U.S. application Ser. No. 16/943,930 filed on Jul. 30, 2020, the entire contents of which are incorporated herein by reference.

BACKGROUND

In recent years, various methods for additive manufacturing capable of relatively easily producing a three-dimensionally (3D) shaped object having a complicated shape have been developed. One example of additive manufacturing is powder bed fusion that allows for high shaping accuracy and high bonding strength between laminated layers. As such, the powder bed fusion method can be used not only for manufacturing a prototype for confirming the shape or property of a final product, but also for manufacturing the final product.

In powder bed fusion, shaped object layers are defined by finely dividing a three-dimensionally shaped object in a thickness direction, which is generally referred to as slicing or slices. To start the build a powder material containing particles including a resin material or a metal material is spread flatly to form a thin layer, a desired position on the thin layer is irradiated with a laser, and the particles containing the powder material are selectively sintered or melted to be bonded to each other (hereinafter bonding of particles by sintering or melting is simply referred to as "fusion") to form one of the defined layers. The powder material is further spread on the layer thus formed and irradiated with a laser to selectively fuse the particles contained in the powder material to form a next shaped object layer, according to the layer definition. By repeating this procedure and laminating the shaped object layer, a three-dimensionally shaped object having a desired shape is manufactured.

Control of lasers in powder bed fusion (L-PBF) results in a volatile nature of the melt pool generated using conventional single laser spot delivery of power. Other inherent weaknesses of the single laser spot approach are key-holing, lack of fusion between layers due to solidified melt pool geometry, spatter and fumes being created, etc. Thus, in this conventional process, the concentration of high linear energy density in a small sized spot results in excessive energy concentration applied onto the layer of powder causing a volatile melt pool that results in defects. The most common defect is key holing where the conduction melting mode changes into conditions where molten metal evaporates and creates porosity within the build, allowing for the energy penetration into a far deeper depth than in conduction mode, thereby trapping the created porosity during rapid solidification. Fusion defects can also occur when the melt pool does not sufficiently overlap the previous layer or line resulting in unmelted areas. Highly concentrated energy via single spot also results in a thermal gradient being created during rapid melting and rapid solidification, causing residual stresses in the manufactured part. These stresses can lead to distortions and even cracks during or after processing.

A need exists for performing powder bed fusion that is less volatile and results in more controllable and reliable manufacture of parts.

SUMMARY

Some implementations comprise a method for additively manufacturing an object. The method comprises applying heat to a first plurality of metallic particles in a powder bed using a first heat source, wherein the first heat source is one of multiple heat sources configured into an array, and the first heat source generates a first melt pool. The method further comprises simultaneously applying heat to a second plurality of metallic particles in the powder bed using a second heat source of the multiple heat sources in the array to generate a second melt pool. The first plurality of metallic particles are separated from the second plurality of metallic particles by a distance, wherein the distance and an amount of heat from each heat source is controlled to generate a combined melt pool that is larger in size and encompasses the first and second melt pools. The method also comprises allowing the combined melt pool to solidify to form the object.

Some implementations comprise an additive manufacturing system that includes a powder bed configured to accept a coating of metallic particles and an array of heat sources comprising at least a first heat source and a second heat source. The first heat source is configured to apply heat to a first plurality of adjacent metallic particles in the coating to generate a first melt pool, and the second heat source is configured to apply heat to a second plurality of adjacent metallic particles in the coating to generate a second melt pool. The first plurality of adjacent metallic particles are separated from the second plurality of adjacent metallic particles by a distance. The distance and an amount of heat from each said heat source is controlled to generate a combined melt pool that is larger in size and encompasses the first and second melt pools.

Some implementations comprise one or more computer storage devices having computer-executable instructions stored thereon for operating heat sources during additive manufacturing, which, on execution by a computer, cause the computer to perform operations comprising applying heat to a first plurality of metallic particles in a powder bed using a first heat source. The first heat source is one of multiple heat sources configured into an array, the first heat source generating a first melt pool. The operations further comprise simultaneously applying heat to a second plurality of metallic particles in the powder bed using a second heat source of the multiple heat sources in the array to generate a second melt pool. The first plurality of metallic particles is separated from the second plurality of metallic particles by a distance. The distance and an amount of heat from each heat source is controlled to generate a combined melt pool that is larger in size and encompasses the first and second melt pools. The operations further comprise allowing the combined melt pool to solidify to form the object.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein.

Corresponding reference characters indicate corresponding parts throughout the drawings in accordance with various examples.

Figure 1:
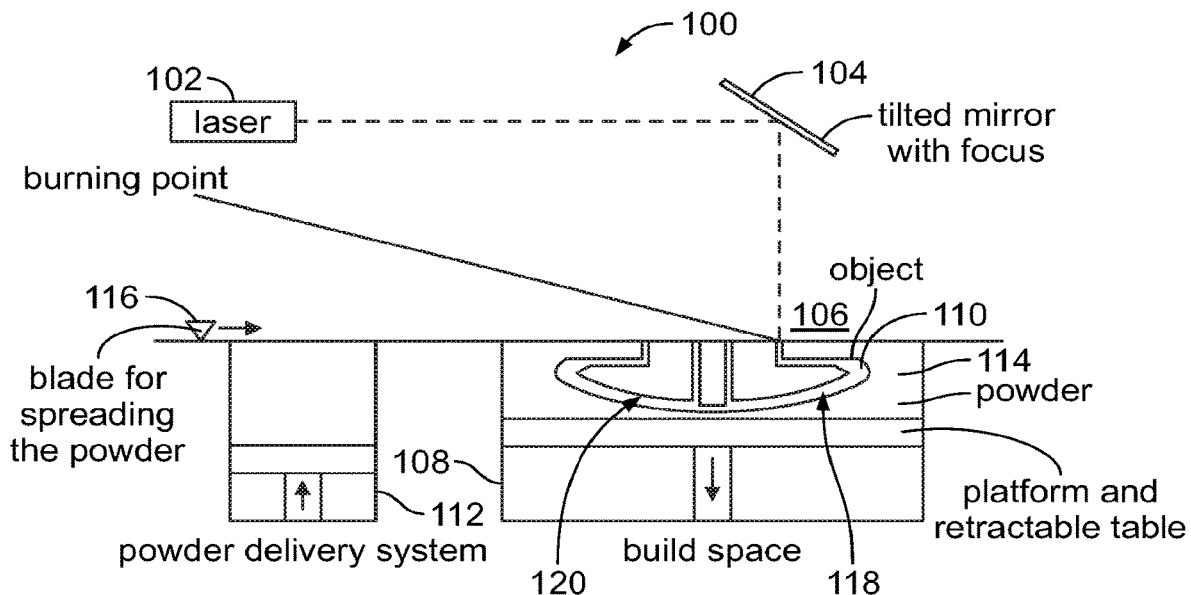
FIG. 1 illustrates a powder bed fusion additive manufacturing (AM) system that uses a heat source array according to an example of the present disclosure.

It should be noted that some details of the figures have been simplified and are drawn to facilitate understanding of the present teachings rather than to maintain strict structural accuracy, detail, and scale.

DETAILED DESCRIPTION

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment", "one configuration", "one example", or "one implementation" are not intended to be interpreted as excluding the existence of additional embodiments, configurations, examples, or implementations that also incorporate the recited features. Moreover, unless explicitly stated to the contrary, embodiments "comprising" or "having" an element or a plurality of elements having a particular property can include additional elements not having that property.

While various spatial and directional terms, such as "top," "bottom," "upper," "lower," "vertical," and the like are used to describe inventive aspects of the present disclosure, it is understood that such terms are merely used with respect to the orientations shown in the drawings. The orientations can be inverted, rotated, or otherwise changed, such that a top side becomes a bottom side if the structure is flipped 180 degrees, becomes a left side or a right side if the structure is pivoted 90 degrees, and the like.

Implementations of the present disclosure include an array of heat sources, (e.g., lasers) used in a powder bed fusion AM process. The disclosed array arrangement, either directly applied onto powder bed or projected thereon, is configured for processing of metal alloys, particularly for processing of titanium and titanium alloys.

Some implementations of array patterns allow for improved heat distribution for melting metal powder, including eliminating or reducing some of the problems of the single laser spot approach. Additionally, the present disclosure allows the array of lasers to utilize the latent heat generated by individual laser spots in the array rather than allowing the rapid dissipation that occurs during single laser spot processing. As a result, an increased melting rate is achievable.

Generally speaking, examples of the present disclosure provide for the delivery or projection of multiple laser spots in close proximity within a specified or defined array pattern/geometry to control the melt pool stability, which can resolve the fundamental drawbacks of the traditional approach, while providing a well-controlled melt pool that allows for defect free processing. The shared heat within the array area also allows for increased productivity of the L-PBF process and potential use of a wider powder fraction distribution.

FIG. 1 illustrates a powder bed fusion AM system 100 that uses an array heat source, according to examples of the present disclosure. It should be appreciated that the implementation of the AM system 100 is shown merely for illustration and other implementations can be used in combination with the laser array configurations and laser control methods described herein. That is, different types and arrangements of power bed fusion systems can be used with the present disclosure.

Figure 3:
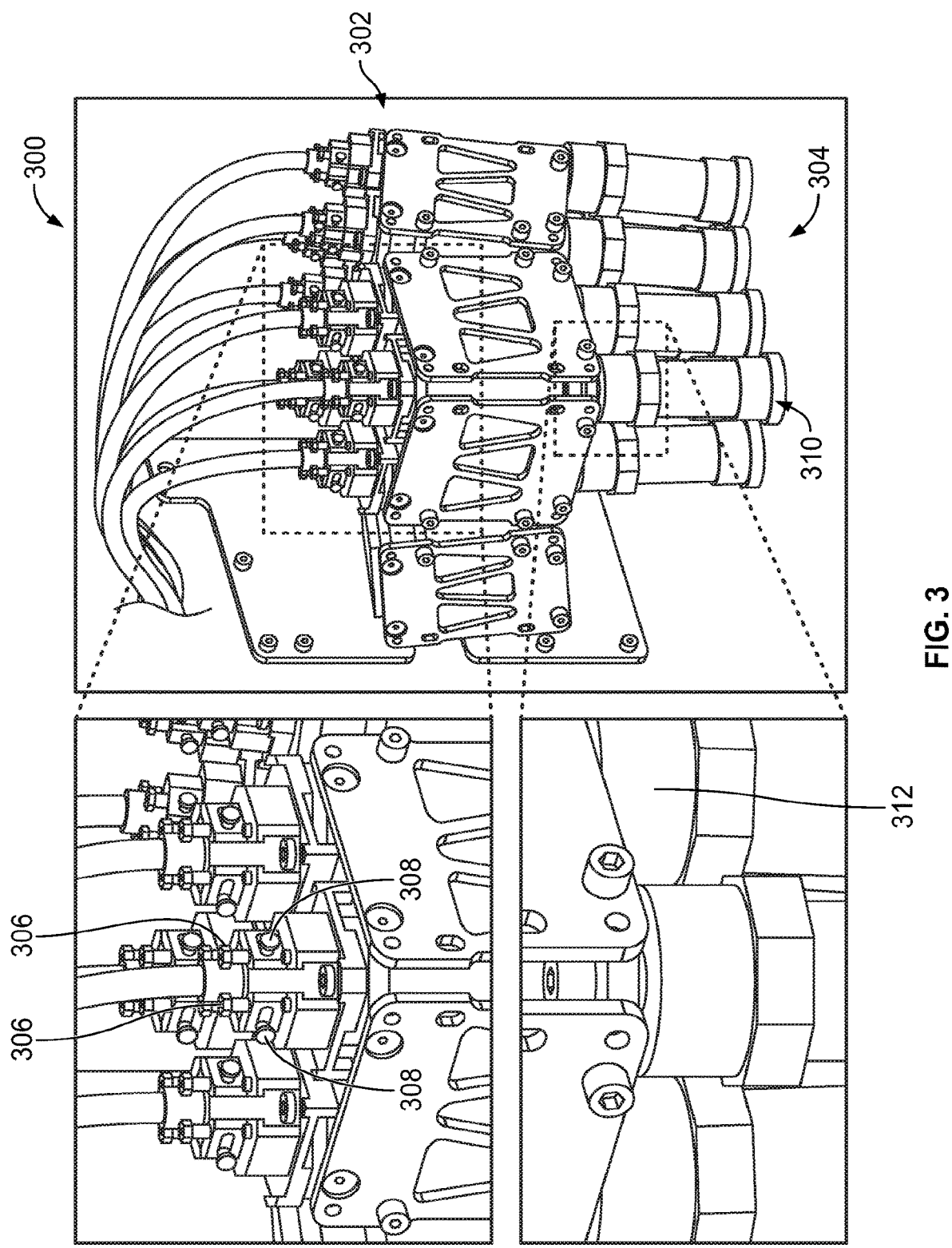
FIG. 3 illustrates a laser array according to an example of the present disclosure.

In the illustrated example, the powder bed fusion AM system 100 includes a heat source, illustrated as a laser system 102, which is configured as an array of lasers as shown in more detail in FIG. 3. The laser system 102 is shown merely for illustration and other suitable heat sources can be used that are capable of producing beams or areas of heat of sufficient energy to melt the powder. In one example, the powder bed fusion AM system 100 includes one or more optical components, illustrated as a mirror 104 (e.g., tilted mirror with focusing capabilities) to direct radiation from the laser system 102 to a target location 106 of a build space 108 to build an object 110. The powder bed fusion AM system 100 also includes a powder delivery system 112 configured to store powder 114 and deliver the powder 114 to the build space 108 for used in manufacturing the object 110, such as by generating multiple melt pools 118 and 120 as described in more detail herein. A spreader 116 is provided in some examples and configured to spread powder 114 from the powder delivery system 112 to the build space 108.

Figure 2:
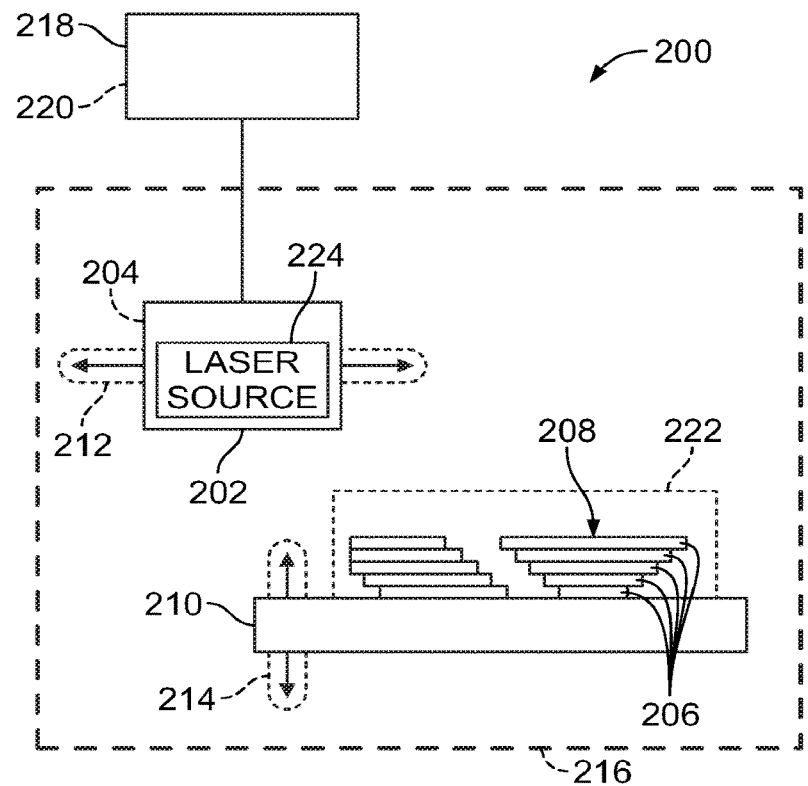
FIG. 2 illustrates a powder bed fusion AM system that uses a heat source array according to another example of the present disclosure.

FIG. 2 is another example of an AM system illustrated as a powder feed AM system 200 in which a heat source configured according to the present disclosure is implemented. Again, FIG. 2 is a non-exclusive example and is configured to perform and/or facilitate the methods described herein. The AM system 200 generally includes an additive manufacturing machine with a deposition device 202. The deposition device 202 optionally includes a stock material supply 204 (e.g., such as for a powder fed or a wire fed system). The stock material supply 204 provides raw material (e.g., at least one base alloy) to an additive-manufacturing head of the deposition device 202. For example, the material is ejected from one or more material outputs provided in the additive-manufacturing head. The one or more material outputs can comprise a variety of configurations such as, for example, apertures, nozzles, etc. The one or more material outputs of the manufacturing head can be comprised of an aperture aligned with the nexus or convergence of the one or more of laser outputs as described in more detail herein. Accordingly, in one implementation, the base alloy (e.g., titanium) is provided to a powder fed system. A base tray 210 carries a stock material supply 222 (e.g., such as for a powder bed system).

In one implementation, and with reference also to FIG. 3, the forming of the melt pool according to the methods described herein comprises exposing at least a portion of the base alloy(s) (e.g., first and second pluralities or portions of metallic particles) to multiple beams of focused energy (e.g., multiple heat sources). Examples of focused energy include electron beam, laser beam, and thermal radiation. In this illustrated examples, a laser source 224 (which can be implemented similar to the laser system 102 of FIG. 1) generates a plurality of laser beams, such as using a laser array 300 (illustrated in FIG. 3), and transmits the laser beams via laser outputs of an additive-manufacturing laser head 302 for emission. The laser beams, emitted from the laser outputs, are concentrated into multiple nexuses or convergences. Thus, in some examples, the deposition device 202 includes an energy source for emitting energy to the feedstock provided by the material supply. In one configuration, the deposition device 202 provides focused beams of energy from the energy source to form multiple melt pools from the feedstock provided by the stock material supply 204, 222. For example, raw material is released from one or more material outputs and enters the nexuses or convergences of the laser outputs, where at least a portion of the provided material/feedstock is melted to form the melt pools. In some examples, the laser outputs operate as heat sources to simultaneously apply heat to generate multiple melt pools. As described in more detail, different laser array configurations and laser movement controls are contemplated by the present disclosure.

In operation, using the AM process, at least a portion of the melt pools are deposited layer-by-layer. That is, deposited layers 206 are formed on the base tray 210. The deposited layers 206 are deposited in a pre-determined pattern in some examples and cool in the form of an in-process article 208. In other words, as the laser source 224, which includes the additive-manufacturing laser head 302 with an array of lasers 304 in one example, advances relative to the product being formed, the melted material of the melt pool begins to cool and harden (i.e., solidify) once the material is out of the weld pool, for example, upon being deposited onto a substrate or onto layers of previously deposited melt pool material.

To assist forming the layers 206 on the base tray 210, in one implementation, the deposition device 202 translates along a lateral stage 212, and the base tray 210 translates along an axial, or vertical, stage 214. The AM system 200 optionally comprises a fabrication chamber 216 that encloses the deposition device 202, the base tray 210, and the layers 206 as formed. It should be appreciated that different types and configurations or movements of one or more different components are contemplated by the present disclosure. For example, the array of lasers 304 are operable to move together (of independently) in one or more directions and at different speeds.

In one example, the deposition device 202 is configured to move away from the base tray 210 and the in-process article 208, leaving a clear path for non-contact. Additionally, or alternatively, the deposition device 202 affords a clear path to a portion of the in-process article 208 and can move relative to the in-process article 208 to sequentially expose all portions of the in-process article 208. The AM system 200, including one or more of the components thereof, is controlled by a controller 218, which is configured as a computer 220 in some examples. The controller 218 coordinates the operation of the deposition device 202 (and other components) and can be programmed to perform any of the manufacturing methods illustrated and described herein (e.g., using a two-axis gantry system).

It should be noted that additive manufacturing devices can be available or modifiable to accomplish forming of the part in the same chamber as the deposition device. Melting can include exposure to electron beam, plasma, electric arc, laser energy, touch flame, etc. Examples of the base alloy comprise metals/metal alloys such as a titanium-based alloy. Examples of titanium alloy powder include, but are not limited to, titanium powder designated as Ti-6Al-4V containing approximately 90 percent titanium alloyed with approximately 6 percent aluminum and approximately 4 percent vanadium.

The base alloy for the various examples can be provided in the form of a wire, powder or liquid or a combination thereof. Base alloy wire can be provided in any size or combination of sizes without limitation, such as for use by the AM system 200. In one example, base alloy wire is provided in up to one-eighth inch size. The powder can comprise one or more base alloy particles. The base alloy particles can be provided in any size or combination of sizes, without limitation. For example, the raw base alloy can be in powder form comprising particles in a size of from about 10 microns to about 250 microns, such as from about 45 microns to about 105 microns, including from about 10 microns to about 45 microns. The base alloy particles provided in this size range provide for better flowability and easier melting, leading to more evenly distributed powders and more evenly distributed modified alloy chemistries. Thus, while many processing systems, such as laser or electron beam systems are configured to melt powders having particles with sizes in the range of from about 10 microns to about 250 microns, other sizes can be utilized. The base alloy particles can be provided in any shape or combination of shapes, without limitation. For example, the raw base alloy particles can be in powder form comprising particles of spherical, sponge, flake and the like.

In various examples, the heat generated by the array of lasers 304 is controlled to effectively form the multiple melt pools. That is, the array of lasers 304 are configured as heat sources that generate a heat sufficient to melt the base alloy particles.

In the illustrated example, the positioning of the array of lasers 304 relative to each other and along the additive-manufacturing laser head 302 are separately and independently adjustable. For example, as illustrated in FIG. 3, screws 306, 308, and 312 are configured to adjust each laser 310 of the additive-manufacturing laser head 302. In this example, the screws 308 are horizontal or side screws that are adjustable to lock each of the lasers 310 to the additive-manufacturing laser head 302. That is, the screws 308 allow for coupling and "rough" positioning of the lasers 310 on the additive-manufacturing laser head 302. The screws 306, illustrated as vertical screws, allow for "fine" tuning of the positioning of the lasers 310 in the additive-manufacturing laser head 302. As a result, the lasers 310 of the array of lasers 304 are configured for precise positioning with respect to each other and within the additive-manufacturing laser head 302. The screws 312 allow for movement of the lasers inward and outward. In one example, with a beam diameter of 120 microns (μm), the screws 306, 308, and 312 allow for x-direction adjustment, y-direction adjustment, and z-direction adjustment to position the laser within a 10 μm maximum error. Thus, in the illustrated example, the screws 306 and 308 allow for variable adjustment of the positioning of the lasers 300 (e.g., change the alignment of one or more of the lasers 300).

Thus, a plurality of different screws 306 and 308 are provided to allow adjustments of the lasers 304 in different directions or axes. The laser head 302 in one examples includes a plurality of screws that allow for adjustment in the x-direction, the y-direction, and the z-direction.

It should be appreciated that different adjustment mechanisms are contemplated by the present disclosure. That is, the adjustment mechanisms can include mechanical components, electrical components, optical components, or a combination thereof. In some examples, the adjustment mechanisms for adjusting the lasers 300 include actuators that are controllable by programming. In one configuration with an actuator, the controller 218 is programmed to control the positioning of the lasers 300 (e.g., change the position of the lasers 300), such as based on the particular application. It should be noted that the lasers 300 can be adjusted before, during, and/or after AM operation. Thus, the present disclosure contemplates adjustments at different time and using different control mechanisms that can allow for automatic adjustments, semi-automatic adjustments, and/or manual adjustments. For example, in one configuration, manual adjustments to the physical positioning of the lasers 306 are made prior to AM operation to define a fixed array. Thereafter, adjustments, such as to the relative positions of the laser beams are made using optics and optical control arrangements known in the optics technology. In one example, an optical window is used and configured for movement to adjust the direction of one or more of the laser beams generated by the lasers 306.

In some examples, additional adjustments are contemplated, such as tilt adjustments of the lasers 310. However, in still other examples, the tilt angle of each of the lasers 310 is fixed by the configuration of the additive-manufacturing laser head 302 (e.g., alignment locations for the lasers 310).

Figure 4:
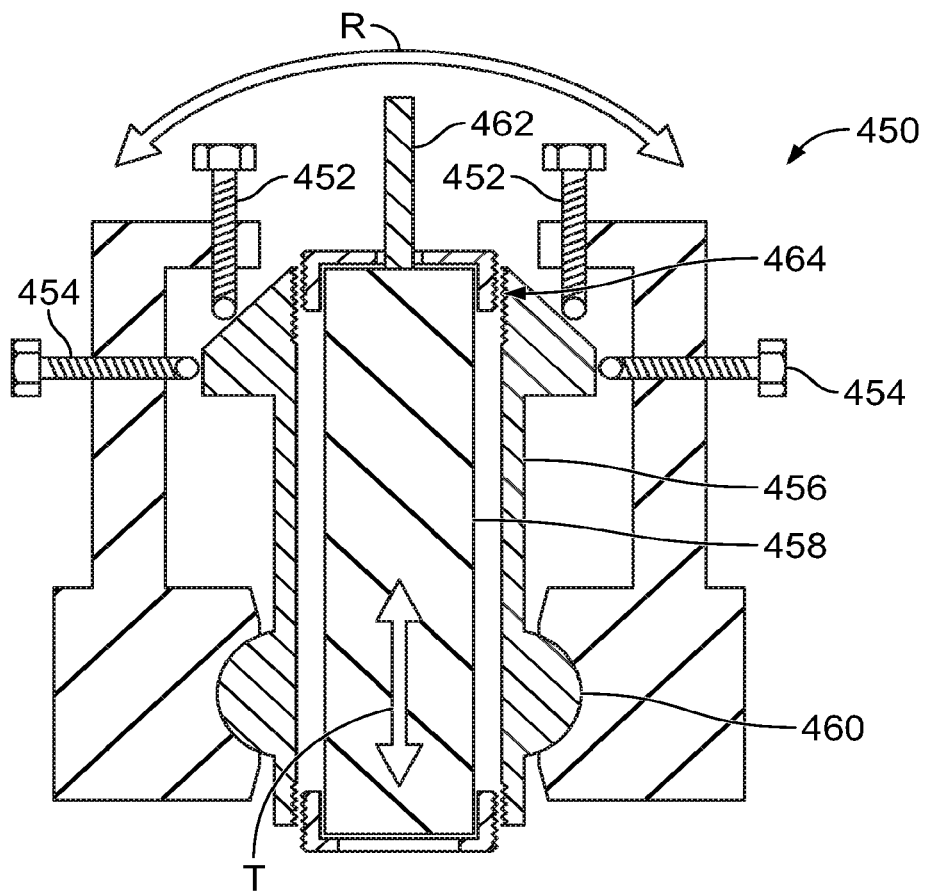
FIG. 4 illustrates a laser array according to another example of the present disclosure.

Different configurations for adjustment are contemplated, such an adjustment arrangement 450 illustrated in FIG. 4. In this example, screws 452 and 454 are separately and independently adjustable to change a positioning of a laser collimator holder 456 holding a laser collimator 458 that collimates one or more laser beams, such as generated by the lasers 310 (shown in FIG. 3). In the illustrated configuration, the screws 452 and 454 are adjustable to cause the laser collimator 458 to rotate (illustrated by the arrow R) about a ball and socket joint 460. That is, the screws 452 and 454 allow movement of the laser collimator holder 456 that rotates the laser collimator 458 left or right as viewed in FIG. 4. Thus, in some examples, adjustment of laser spot position can be made via screws 452 and 454 that directly apply force upon the laser collimator holder 456 (e.g., a laser collimator holding tube) and/or that bear on 45-degree elements to distribute the locking force both horizontally and vertically.

Additional adjustments can be performed in some examples. For example, the laser collimator holder 456 is also configured, in one arrangement, to allow translational movement of the laser collimator 458 (illustrated by the arrow T), which is up and down as viewed in FIG. 4. That is, the laser collimator holder 456 is configured to allow the laser collimator 458 to move longitudinally therein. The movement of the laser collimator 458 can be accomplished using any suitable actuator and control means, illustrated as a control arm 462 and locking teeth 464 that move the laser collimator 458 and secure the laser collimator 458 in a fixed position within the laser collimator holder 456.

It should be appreciated that different types and kinds of adjustment mechanisms can be used to cause different types and kinds of movements, such as to allows different positions and orientations of the lasers 310. Thus, various examples allow for individual adjustment of the lasers 310, and the spot size and position for all lasers 310, such as in the mechanism for changing the X, Y, and/or Z positions thereof.

Figure 5:
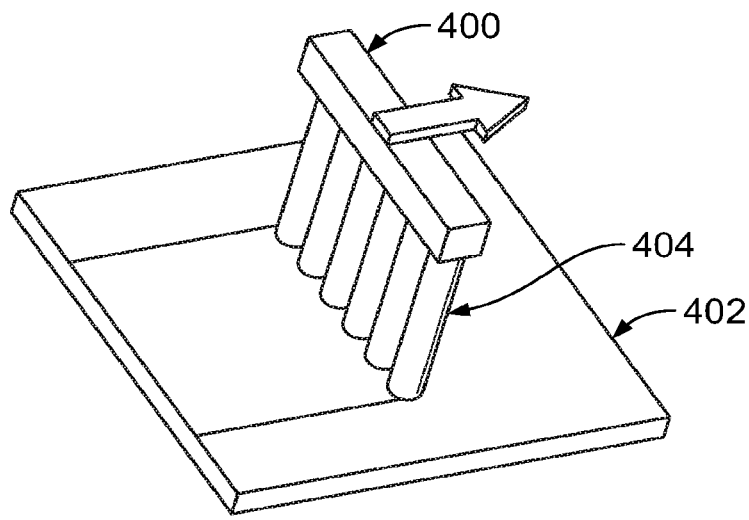
FIG. 5 illustrates operation of a powder bed fusion AM system that uses an array heat source according to an example of the present disclosure.

It should also be appreciated that different configurations of lasers are contemplated. For example, although the array of lasers 304 is illustrated as having eight lasers 310 configured as two rows of four lasers 310, different configurations are contemplated by the present disclosure. For example, a different number of lasers 310 can be used in additional or fewer or rows. That is, different shaped and sized configurations of the lasers 310 can be used (e.g., different geometries of lasers 310). For example, FIG. 5 illustrates an array of lasers 400 configured as heat sources for use with a powder bed fusion AM system. The array of lasers 400 are arrayed in a single column that move (as indicated by the arrow) relative to a build space 402. In some examples, the array of lasers 400 configured as heat sources is stationary and the build space movable. As shown in FIG. 5, the array of lasers 400 includes six lasers 404 that emit six beams 404 of laser that create multiple melt pools that are thereafter combined into a larger melt pool in some examples. It should be appreciated that the movement of the array of lasers 400 can be varied in time and space, such as moved in different directions and at different speeds. The movement of the array of lasers 400 can include simple linear movements or more complex movements, such as shifting or rotating/pivoting movements.

Moreover, the different geometries of lasers 310 can include different one-dimensional (1D), two-dimensional (2D), and three-dimensional (3D) arrangements. The different geometries of lasers 310 can include lasers 310 that are symmetrically and/or asymmetrically aligned, offset, shifted, staggered, etc. That is, the present disclosure contemplates various different shapes, sizes, positions, orientations, etc. of the lasers 310.

Figure 6:
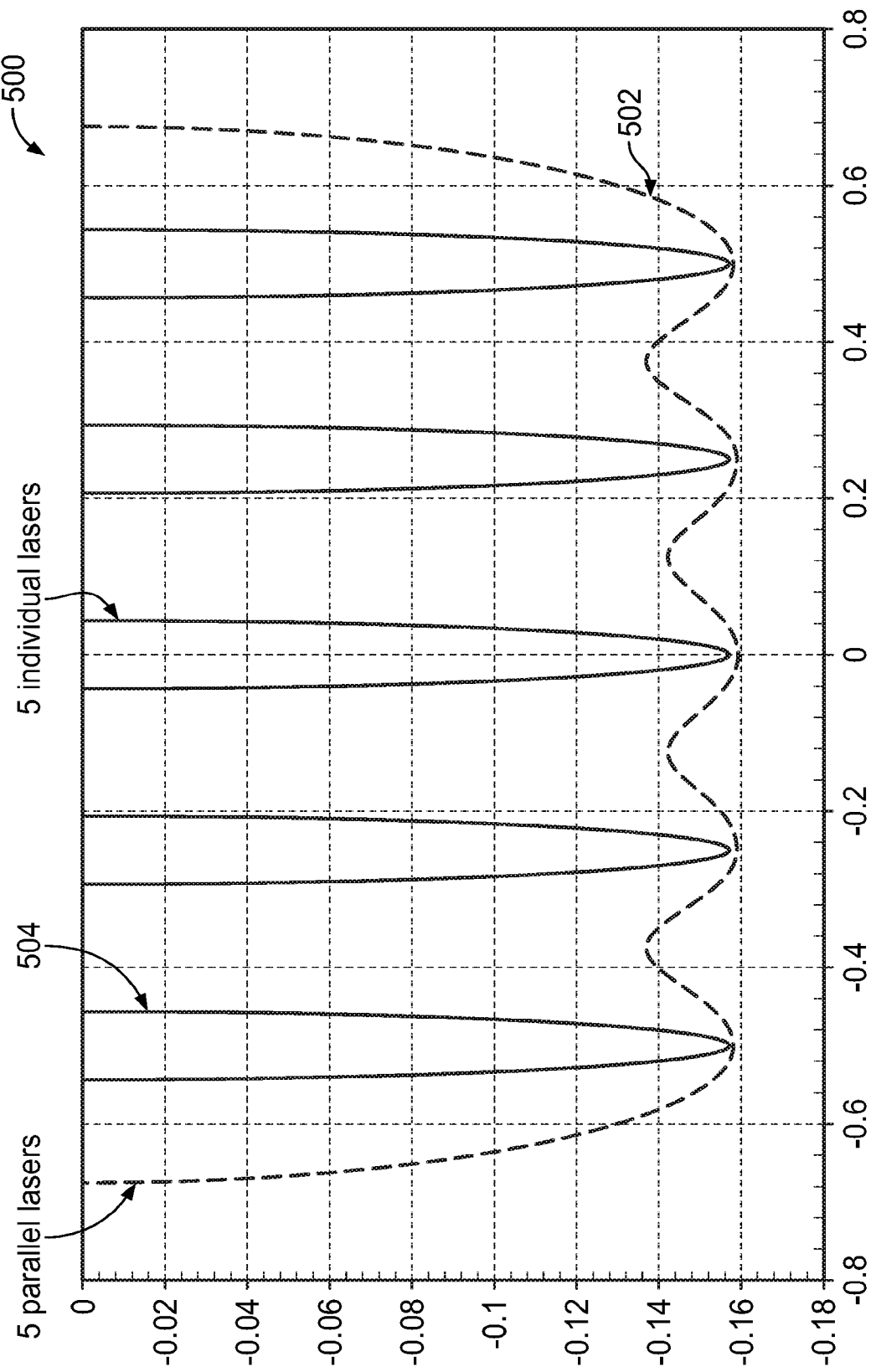
FIG. 6 is a illustrates melt depths of melt pools formed using different heat source array arrangements.

FIG. 6 illustrates a graph 500 of melt depth comparisons showing an extent of melt pools for different heat source array arrangements. A melt pool 502 is generated using a single pass of a one dimensional array of five lasers and the melt pools 504 are generated using five passes of an individual lasers. The melt pools 502 and 504 show the cross-sections of the melt forms formed from each heat source array arrangement. That is, the melt pool 502 is formed from five parallel lasers and the let pool 504 is formed from an individual laser making five passes (at different times). As can be seen, the summation of the cross-sectional areas of the melt pools 504 generated by five individual single laser passes (summation of the areas subtended by the corresponding line lines) is much less than the cross-sectional area of the melt pool 502 achieved by passing a spaced simultaneous linear array of five lasers (area-subtended by the subtended by the corresponding line). Thus, the present disclosure generates an enlarged melt pool in some examples, which is achieved in a shorter time period than using single lasers (e.g., proximity of the laser beams allows for faster melting than individual beams operating in multiple passes).

In various examples, and as should be appreciated from viewing the graph 500, the present disclosure thereby also provides heat sharing as shown by the melt isotherms. It should be noted that the melt pools 502 and 504 illustrate speeds matched for depth.

Figure 7:
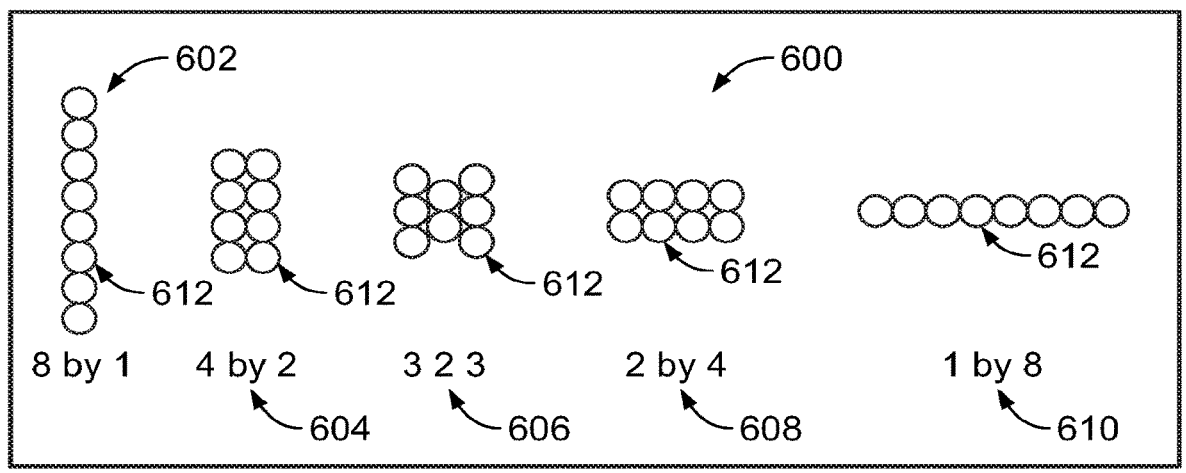
FIG. 7 illustrates heat spot configurations generated according to examples of the present disclosure.

Different configurations 600 of arrays of lasers are shown in FIG. 7. It should be noted that while this figure illustrates heat spot configurations produced by arrays of lasers having eight lasers, different numbers of laser can be used, including both odd and even numbers of lasers. The different heat spot configurations correspond to lasers arranged in a similar pattern as heat sources to generate the heat spots. That is, the geometry of the lasers that produce the heat spots are arranged in the same geometry (e.g., orientation) as the generated heat spots 612.

More particularly, FIG. 7 illustrates a 8×1 configuration shown at 602, a 4×2 configuration shown at 604, a 3×2×3 configuration shown at 606, a 2×4 configuration shown at 608, and a 1×8 configuration shown at 610. Other heat spot configurations can be produced using different geometries of laser. For example, for a four heat spot configuration, the heat spots can be arranged in a 4×1, 2×2, or a 1×4 configuration. Thus, the present disclosure contemplates configurations having multiple rows and columns, which may be of different numbers, such as to define a non-symmetrical configuration or a non-rectangular configuration (e.g., two rows having a first number of lasers each and one row having a second different number of lasers). That is, different rows and/or columns, or subsets of rows and/or columns, can have different numbers of lasers therein. In some examples, alternating rows and/or columns of different numbers of lasers are provided. In other examples, the rows/columns having different numbers of lasers are provided in different non-repeating or non-alternating configurations.

It should be appreciated that the characteristics and properties of the heat spots 612 can be varied based on the operating configuration and parameters of the lasers. For example, the temperature generated by and the distance between the lasers (or the distance between corresponding generated heat spots 612) can be changed based on a desired or needed pattern or geometry of heat spots 612, including the size, spacing therebetween, temperature, etc. of the heat spots 612. Thus, by changing the operating parameters of the lasers or the physical arrangement of the lasers, the characteristics and properties of the heat spots 612 are adjusted, which results in different characteristics or properties for generated melt pools (e.g., size of melt pools, time to generate melt pools, etc.).

Figure 8:
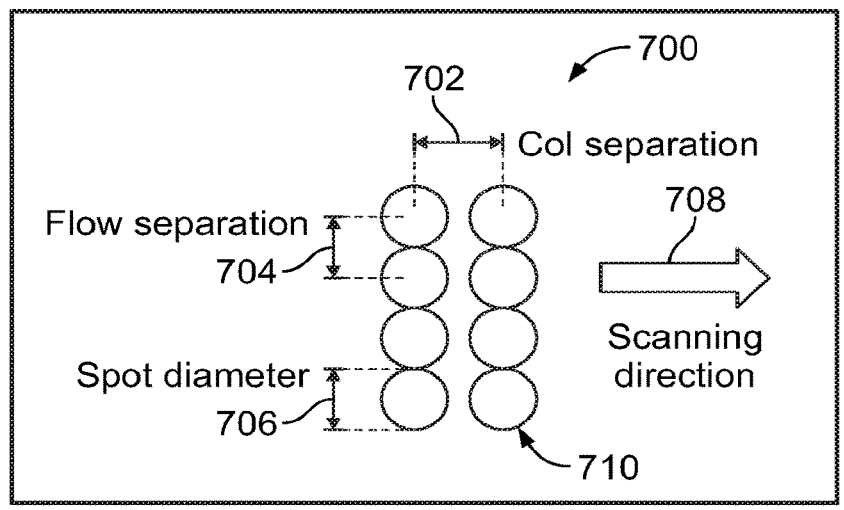
FIG. 8 illustrates a heat spot configuration having eight heat spots produced by heat sources according to an example of the present disclosure.

For example, FIG. 8 illustrates a heat spot configuration 700 comprising eight heat spots 710 produced by a plurality of heat sources (e.g., lasers) arranged in two columns of four rows (2×4), according to examples of the present disclosure. The arrangement of the heat sources defines the geometry of the heat spots 710, including a column separation 702, row separation 704, and a spot diameter 706 in some examples. That is, the properties of the geometry of the heat spot configuration 700 is defined by the geometry of the lasers generating the heat spots 710. In operation, the heat spot configuration 700 is movable in a scanning direction 708, as indicated by the arrow. However, it should be appreciated that different scanning directions are contemplated. Also, with parameters selected as described herein, the heat spots 710 are non-overlapping.

Figure 9:
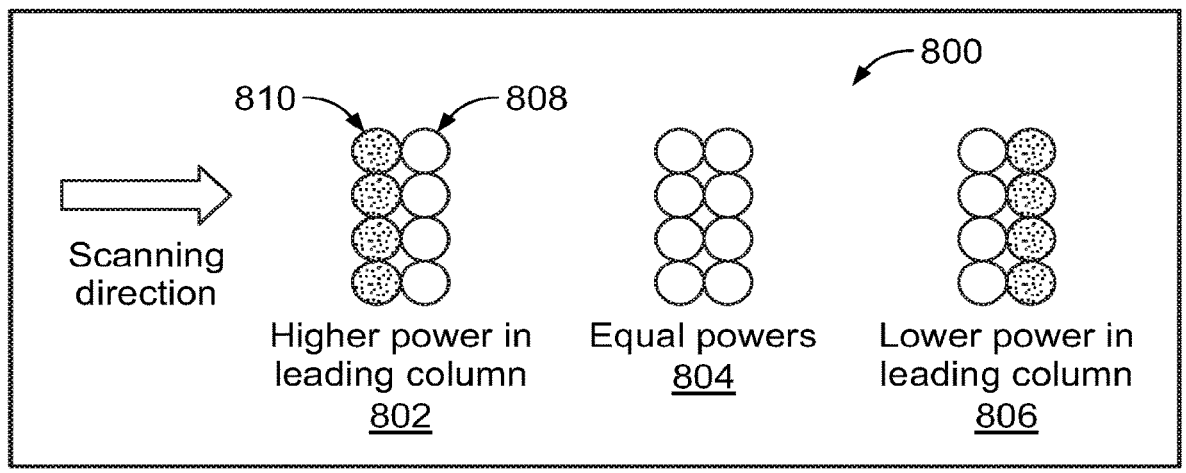
FIG. 9 illustrates different power configurations for generating heat spots according to examples of the present disclosure.

Additionally, the operating properties of the lasers can be adjusted, such as to provide different power configurations 800 of heat spots as shown in FIG. 9. That is, the power of the different rows and/or columns of lasers (or of the individual lasers) can be adjusted to define the different power configurations 800, or other configurations. In the illustrated example, a configuration 802 provides a higher power in a leading column 808 (than in a trailing column 810), a rectangular configuration 804 provides for equal power in both columns 808 and 810, and a configuration 806 provides for lower power in the leading column 808 (than in the trailing column 810). Thus, the relative heat generated by the lasers in different columns and/or rows can be adjusted as desired or needed by adjusting one or more properties of the lasers generating the heat spots. In one example, minimum and maximum power levels for lasers operating at full power in each column are defined (e.g., 40 watts (W) and 400 W). The power levels also can be adjusted, for example, based on the feed rates of the powder stock. In one example, for lower feed rates, such as 66 millimeters/second (mm/s), a power level of 1.6 Joules (J)/mm is used, resulting in a total power of 105 W. However, other power levels and feed rate combinations are contemplated. For example, 218 mm/s with a power level of 1.66 J/mm is used in some examples, resulting in a total power of 363 W, or 443 mm/s with a power level of 0.86 Joules J/mm is used in other examples, resulting in a total power of 381 W. The power levels and feed rates are adjusted in various examples to provide suitable substrate penetration and stability.

Thus, columns can have different power levels. In some examples, front end preheating is employed with back end cooling. It should be appreciated that power levels can be varied across the different columns as desired or needed. In some examples, all spots in a particular column have a first power, and all spots in a second column have a second different power. However, one or more spots in each column can have a different power than one or more spot in that same column.

It should be appreciated that although FIG. 9 illustrates a 2×4 heat spot configuration, this is merely one non-limiting example. Other numbers of heat spots can also be arranged in the herein described configurations (or other configurations) in accordance with the present disclosure. It should be noted that in various examples, the heat sources are controlled to generate non-overlapping heat spots.

Thus, the array of lasers of the present disclosure configured as heat sources can be varied to simultaneously generate different melt pools during an AM process. The geometry of the lasers, as well as other characteristics or operating parameters of the lasers can be varied to generate different geometries and patterns of heat spots, for example, heat spots having different spot sizes, spot separations, and column separations. In some examples, the spot sizes, spot separations, and column separations can vary between 150 μm to 300 μm. However, it should be appreciated that other ranges of values are contemplated. In one example, for a column of lasers having an overall length of 1.4 mm, a heat spot diameter of 150 μm is generated with a pitch between heat spots of 250 μm. It should be noted that the values for each of the spot sizes, spot separations, and column separations can be the same or different.

Moreover, modeling of the heat sharing process indicates that heat sharing occurs when residual heat stored within parallel melt pools allows those melt pools to merge before solidification occurs. This process allows several small laser sources to act as though these laser sources are one large laser source.

Based on the modeling predictions, an experiment was performed to show the benefits of using multi-spot arrays of lasers to perform LPBF additive manufacturing. The array geometry variables were kept constant, while the number of spots were varied systematically. Power-feed rate combinations were kept constant for all spot numbers. Hatch distance percentages were kept as close as possible across each array.

Results show that the highest normalized melt rate at which 99.99% density is achievable increases logarithmically as spots were added to the array. The largest increase in both of these parameters occurs with the addition of the second spot, with subsequently smaller increases for each additional spot.

These results show that heat sharing occurs between individual lasers resulting in significant improvements in process efficiency. While efficiency gains are asymptotically limited after 8 to 10 lasers, significant improvements in absolute melt rate can still be made with the addition of any number of lasers.

Tables 1 and 2 show experimental results of various parameter combinations and results from three data sets, respectively.

TABLE 1

Experimental Parameter Combinations

| Spot size (μm) | Spot separation (μm) | Number of replicates | Mean Archimedes density of replicates (%) | Replicate density standard deviation (%) |
|---|---|---|---|---|
| 75 | 150 | 6 | 97.4 | 0.8 |
| 75 | 225 | 5 | 97.8 | 0.3 |
| 75 | 300 | 7 | 94.9 | 1.5 |
| 100 | 150 | 6 | 98.6 | 0.7 |
| 100 | 225 | 5 | 98.4 | 1.0 |
| 100 | 300 | 7 | 95.6 | 0.6 |
| 136 | 300 | 7 | 96.7 | 0.5 |
| 150 | 225 | 7 | 95.8 | 1.0 |
| 150 | 300 | 7 | 97.9 | 0.6 |
| 225 | 300 | 7 | 95.8 | 0.6 |

TABLE 2

Parameter Estimates For Archimedes Density Response Surface Model

| Term | Estimate | Std Error | t Ratio | Prob > \|t\| |
|---|---|---|---|---|
| Power | 2.583 | 0.133 | 19.404 | <0.0001 |
| Spot Size*Spot Separation | 0.001 | 0.000 | 14.439 | <0.0001 |
| Feed Rate*Feed Rate | 17.115 | 1.461 | 11.715 | <0.0001 |
| Power*Power | −1.782 | 0.163 | −10.900 | <0.0001 |
| Spot Size*Spot Size | 0.000 | 0.000 | −10.471 | <0.0001 |
| Spot Size | −0.063 | 0.007 | −9.093 | <0.0001 |
| Feed Rate | 15.302 | 1.952 | 7.840 | <0.0001 |
| Feed Rate*Spot Size | −0.063 | 0.008 | −7.486 | <0.0001 |
| Power*Spot Size | 0.017 | 0.002 | 7.069 | <0.0001 |
| Spot Separation*Spot Separation | 0.000 | 0.000 | −4.632 | <0.0001 |
| Spot Separation | 0.019 | 0.004 | 4.293 | <0.0001 |
| Feed Rate*Spot Separation | 0.021 | 0.006 | 3.736 | 0.0002 |
| Hatch Distance*Hatch Distance | 0.000 | 0.000 | −3.283 | 0.001 |
| Hatch Distance*Spot Separation | 0.000 | 0.000 | 2.818 | 0.005 |

In one example, the model was optimized to achieve 100% density, while minimizing volumetric energy density (VED) and maximizing melt rate. In this example, the optimum parameter combination is power=116 W, scan speed=66 mm/s, Hatch distance=1225 μm, spot size=75 μm, spot separation=175 μm. The VED, melt rate and linear energy density (LED) associated with this combination are 76.2 J/mm3, 196.5 g/h and 1.8 J/mm respectively.

In some examples, the VED is calculated to determine the different operating characteristics of the lasers. It should be noted that the VED and melt rate (MR) are inversely related. The VED can be represented as shown below:

$$VED = \frac{P}{v*h*t} \quad (1)$$

having units of $$\text{Units} = \frac{J}{mm^3}$$

where P is the laser power, v is the scan speed (mm/hour), and t is the powder layer thickness (mm). The MR can be represented as shown below:

$$MR = \rho vth \quad (2)$$

and can be represented as:

$$MR = \rho \frac{P}{VED} \quad (3)$$

having units of $$\text{units} = \frac{g}{H}$$

where ρ is density of material. As can be seen in the above equations, (i) increasing the laser power increases the VED and (ii) increasing the scan speed, the hatch spacing or the layer thickness decreases the VED. As such, if it is desired to increase the melt rate, then the power can be increased, and the VED can be decreased by increasing t, v, or h, or by heat sharing in heat source arrays with separated spots (subject to the constraint that the density is 99.99%). In one example, a density of the laser spots is generated using the following parameters:
Feed Rate=40 mm/s;
Power=200 W;
Density=99.99%;
Hatch spacing=0.9 mm;
Powder layer=100 μm; and
VED=55.5 J/mm3.

In one example, with the present disclosure, a melt rate greater than 500 g/h at 3.2 kW, a density of 99%, and a pore size less than 50 μm as achieved. It should be appreciated that various parameters can be controlled according to the present disclosure to control the generation of the laser spots. For example, parameters such as power, feed rate, and hatch distance can be varied as desired or needed, such as for the particular application. In some examples, one or more of spot size, spot separation, power, feed rate, and hatch distance can be manually or automatically adjusted. In one example, the parameters are selected such that parallel melt pools merge before solidification.

In some examples, the laser power is 200 W, the beam diameter 150 μm, and the feed rate 150 mm/s. With five separate passes of a single laser, distinct melt pools are formed (see FIG. 6). AS should be apricated, the extent of each melt isotherm is proportional to laser power and inversely proportional to feed rate and how much energy is conducted away from the interaction (mainly determined by thermal conductivity and diffusivity of the material). In a LPBF system, the temperature of the substrate at a given point cools significantly between one pass and the next of the laser beam past a given point. As a result, each pass is over effectively the same temperature substrate and each melt pool is the same shape and size as that created by the previous pass of the beam.

With the present disclosure using multiple laser beams, and continuing with the example above, using five simultaneous beams, the vertical conductive losses downwards into the bulk of the material are the same as for a single beam. Thus, the maximum depth of the melt is little more than that achieved with a single beam. However, the horizontal conductive losses are diminished and melt pool of each beam is augmented by heat added by neighboring beams. This results in larger melt pools for each beam and can, with the parameters selected as described herein, result in a single melt pool. It should be appreciated that as the feed rate increases there is less time available for heat sharing and the melt pools can begin to separate. Moreover, with heat sharing using the present disclosure, the spacing of the beams in a parallel array can (and will for optimized efficiency) exceed the hatch spacing that is required by a single beam system.

Thus, with the present disclosure, multi-spot array configurations improve melting efficiency compared with single-spot configurations. It was determined that a normalized melt rate at 99.99% density increases with each additional laser. The point representing one laser is a baseline value at 13.3 g/h/100 W. With the addition of a second laser, the value increases to 31.9 g/h/100 W. This is a factor of 2.4 and indicates that two lasers acting together are more than twice as efficient as a single laser. The value increases logarithmically for each additional laser, plateauing at a value of 38.2 g/h/100 W. This amounts to a 2.9-fold increase in overall efficiency.

Figure 10:
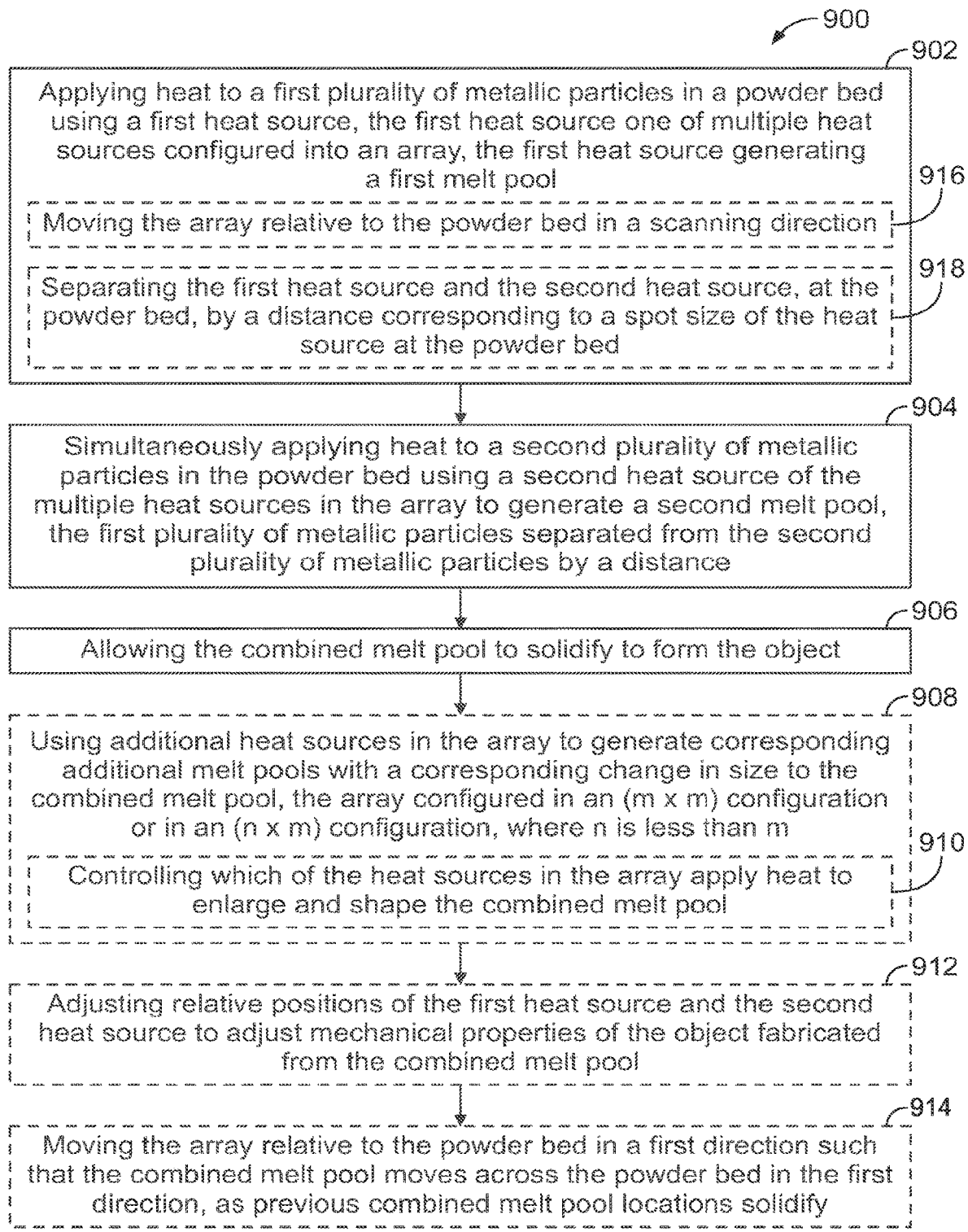
FIG. 10 is a flowchart of a method for additively manufacturing an object according to examples of the present disclosure.

FIG. 10 is a flowchart of a method 900 for additively manufacturing an object, according to examples of the present disclosure. The method can be performed using any of the examples described or contemplated herein. Additionally, one or more steps of the method 900 can be performed in a different order, and additional or fewer steps can be provided. One or more steps can be performed simultaneously, concurrently, or sequentially.

The method 900 includes applying heat, at 902, to a first plurality of metallic particles in a powder bed using a first heat source. The first heat source is one of multiple heat sources configured into an array, and generates a first melt pool. For example, as shown in FIG. 3, the lasers 310 are configured as heat sources and produce heat spots (in a configuration, such as shown in FIG. 7) that melt powder at a target location. That is, each of the lasers 310 are configured to produce a beam that generates heat to melt the powder and form a melt pool (e.g., one of the masers 310 is configured to form a first melt pool as the melt pool 118 shown in FIG. 1).

The method 900 further including simultaneously applying heat, at 904, to a second plurality of metallic particles in the powder bed using a second heat source of the multiple heat sources in the array to generate a second melt pool (e.g., the heat pool 120 shown in FIG. 1). In one example, the first plurality of metallic particles are separated from the second plurality of metallic particles by a distance. The distance and an amount of heat from each heat source is controlled to generate a combined melt pool that is larger in size and encompasses the first and second melt pools. For example, the first heat source and the second heat source are a plurality of lasers that simultaneously melt the powder at two different locations to form two melt pools that will solidify to form the object, or part of the object. That is, the method 900 further includes allowing, at 906, the combined melt pool to solidify to form the object or part thereof.

It should be noted that in some examples, applying heat to metallic particles includes applying heat to particles of a titanium or a titanium alloy.

In some examples, the method 900 includes using additional heat sources in the array, at 908, to generate corresponding additional melt pools with a corresponding change in size to the combined melt pool. For example, the array is configured in an (m×m) configuration or in an (n×m) configuration, where n is less than m. However, as described herein, other configurations are contemplated, such as rows or columns with different numbers of lasers such that a non-rectangular array configuration or a non-symmetrical array configuration results.

The combined melt pool is sized according to the number of heat sources in the array applying heat and the operating characteristics or properties of the lasers as described herein. In the example with additional heat sources in the array, using the additional heat sources in the array to generate the combined melt pool also includes controlling, at 910, which of the heat sources in the array apply heat to enlarge and shape the combined melt pool.

In some examples, the method 900 further includes adjusting, at 912, relative positions of the first heat source and the second heat source to adjust mechanical properties of the object fabricated from the combined melt pool. For example, the spacing and/or alignment of the lasers is adjusted.

In some examples, the method 900 further includes moving, at 914, the array relative to the powder bed in a first direction such that the combined melt pool moves across the powder bed in the first direction, as previous combined melt pool locations solidify (see, e.g., FIG. 5). That is, the movement of the lasers also causes the melt pool to move.

In some examples, applying heat, at 902, further includes moving, at 916, the array relative to the powder bed in a scanning direction. This scanning direction movement can be a linear movement or other types of movement as described herein.

In some examples, applying heat, at 902, further includes separating, at 918, the first heat source and the second heat source, at the powder bed, by a distance corresponding to a spot size of the heat source at the powder bed. That is, the lasers are separated to generate a desired or required pitch between heat spots.

While the aspects of the disclosure have been described in terms of various implementations with their associated operations, a person skilled in the art would appreciate that a combination of operations from any number of different implementations is also within scope of the aspects of the disclosure.

Thus, the present disclosure allows use of a laser array pattern/design of multiple spots to create a melt pool, such as in L-PBF, as opposed to use of multiple lasers creating a melt pool using a single spot. With the arrangement of multiple spots, the present disclosure achieves optimized melt pool and processing conditions for specific alloys in various examples (e.g., titanium and titanium alloys).

Exemplary Operating Environment

Figure 11:
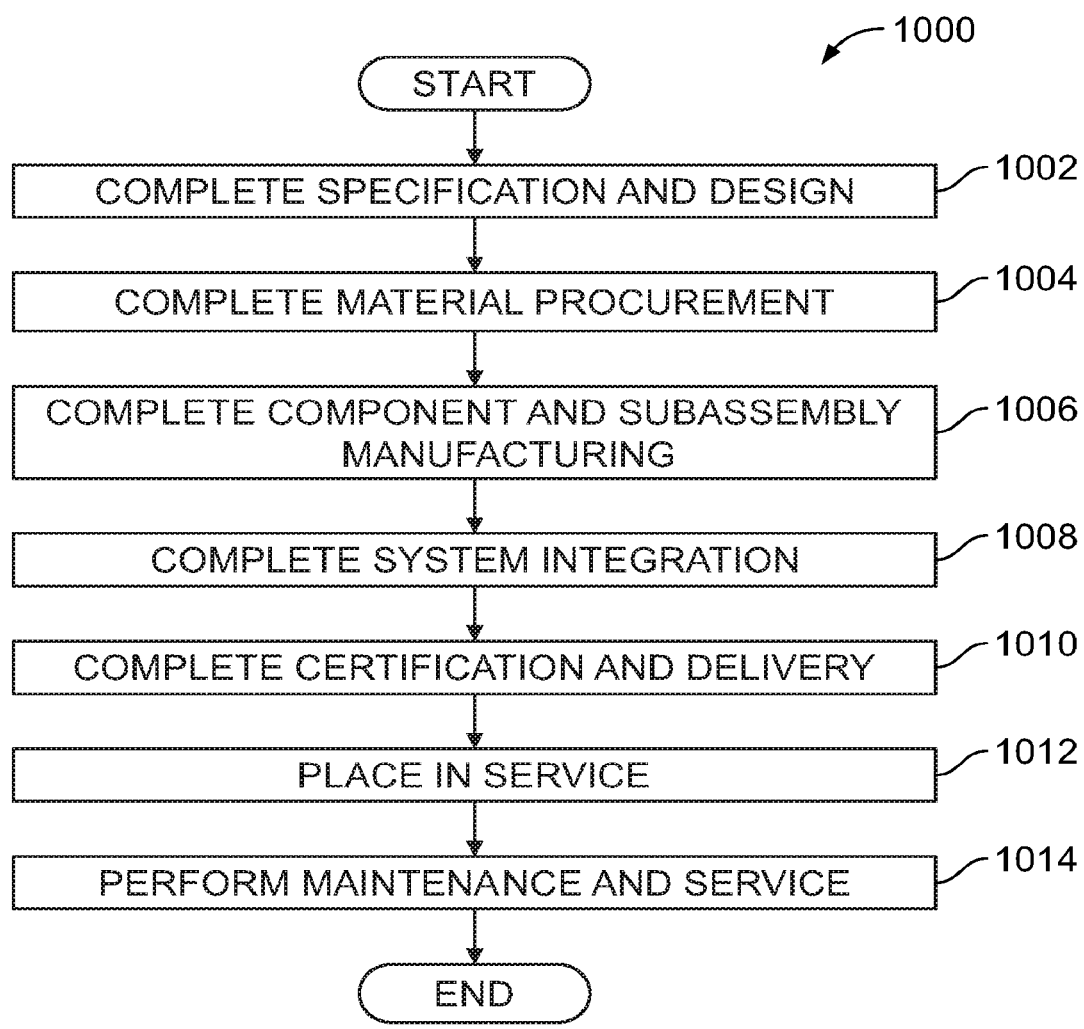
FIG. 11 is a flowchart illustrating a method for aircraft manufacturing and service in accordance with an implementation.

The present disclosure is operable within an aircraft manufacturing and service method according to an implementation as a method 1000 in FIG. 11. During pre-production of the aircraft, some implementations of method 1000 include specification and design of the aircraft at operation 1002, and material procurement at operation 1004. During production, some implementations of method 1000 include component and subassembly manufacturing at operation 606 and aircraft system integration at operation 1008. The aircraft undergoes certification and delivery at operation 1010 in order to be placed in service at operation 1012. While in service of a customer, the aircraft is scheduled for routine maintenance and service at operation 1014. In some implementations, operation 1014 comprises modification, reconfiguration, refurbishment, and other operations associated with maintaining the aircraft in acceptable, safe condition during ongoing flight operations. Systems and methods for additive manufacturing as disclosed herein are used during, for example, operation 1006 and/or 1014.

Each of the processes of method 1000 are performable or practicable by a system integrator, a third party, or an operator (e.g., a customer). For the purposes of this disclosure, a system integrator comprises any number of aircraft manufacturers and major-system subcontractors; a third party comprises any number of vendors, subcontractors, and suppliers; and an operator comprises an airline, leasing company, military entity, service organization, and similar entities providing similar sales and leasing services.

Figure 12:
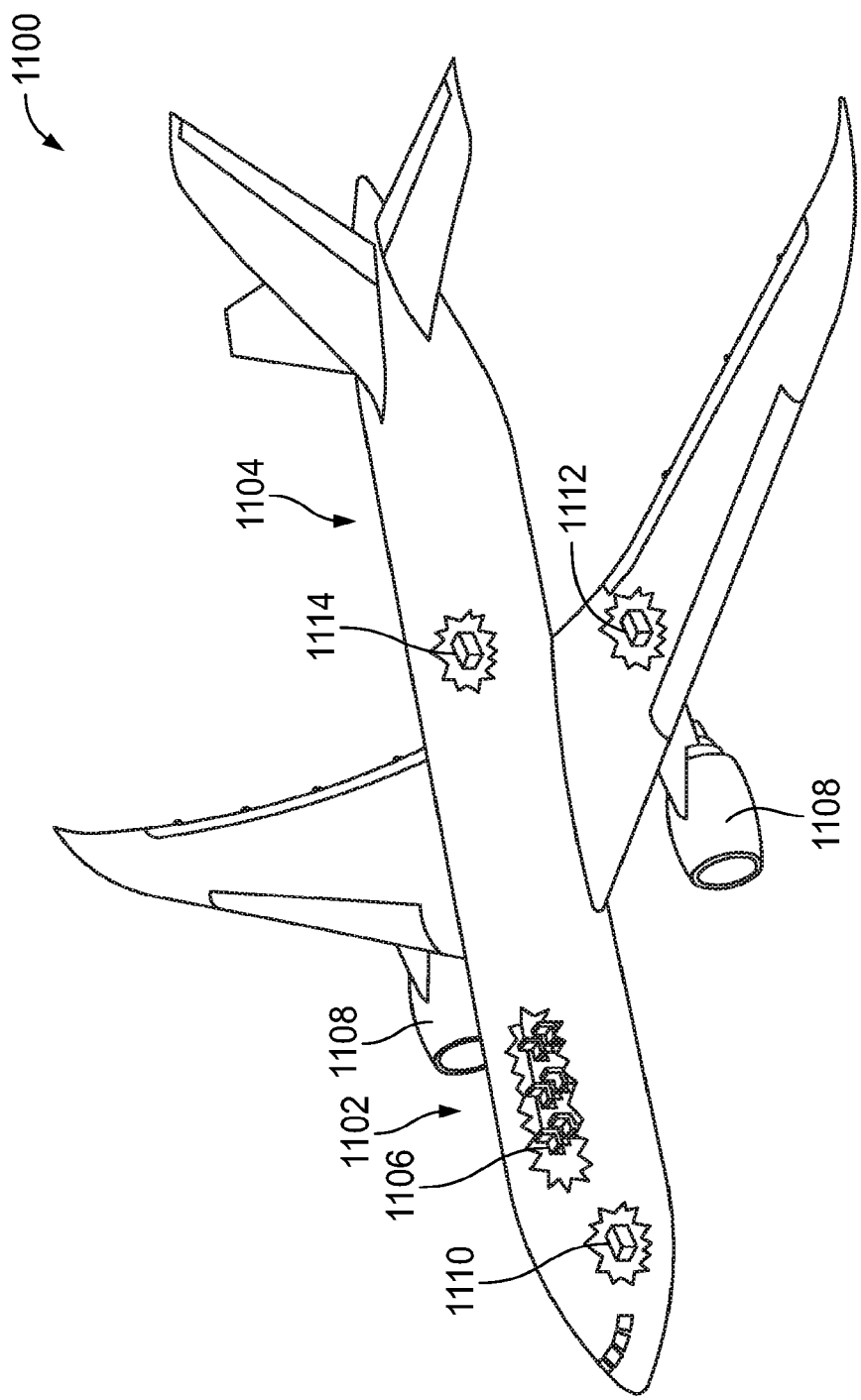
FIG. 12 is a schematic perspective view of an aircraft according to an example of the present disclosure.

The present disclosure is operable in a variety of terrestrial and extra-terrestrial environments for a variety of applications. For illustrative purposes only, and with no intent to limit the possible operating environments in which implementations of the disclosure operate, the following exemplary operating environment is presented. The present disclosure is operable within an aircraft operating environment according to an implementation as an aircraft 1100 in FIG. 12. Implementations of the aircraft 1100 include, but are not limited to, an airframe 1102, a plurality of high-level systems 1104, and an interior 1106. Some implementations of the aircraft 1100 incorporate the high-level systems 1104 including but not limited to: one or more of a propulsion system 1108, an electrical system 1110, a hydraulic system 1112, and an environmental system 1114. Any number of other systems can be included in implementations of the aircraft 1100. Although an aerospace implementation is shown, the principles are applicable to other industries, such as the automotive and nautical industries.

Figure 13:
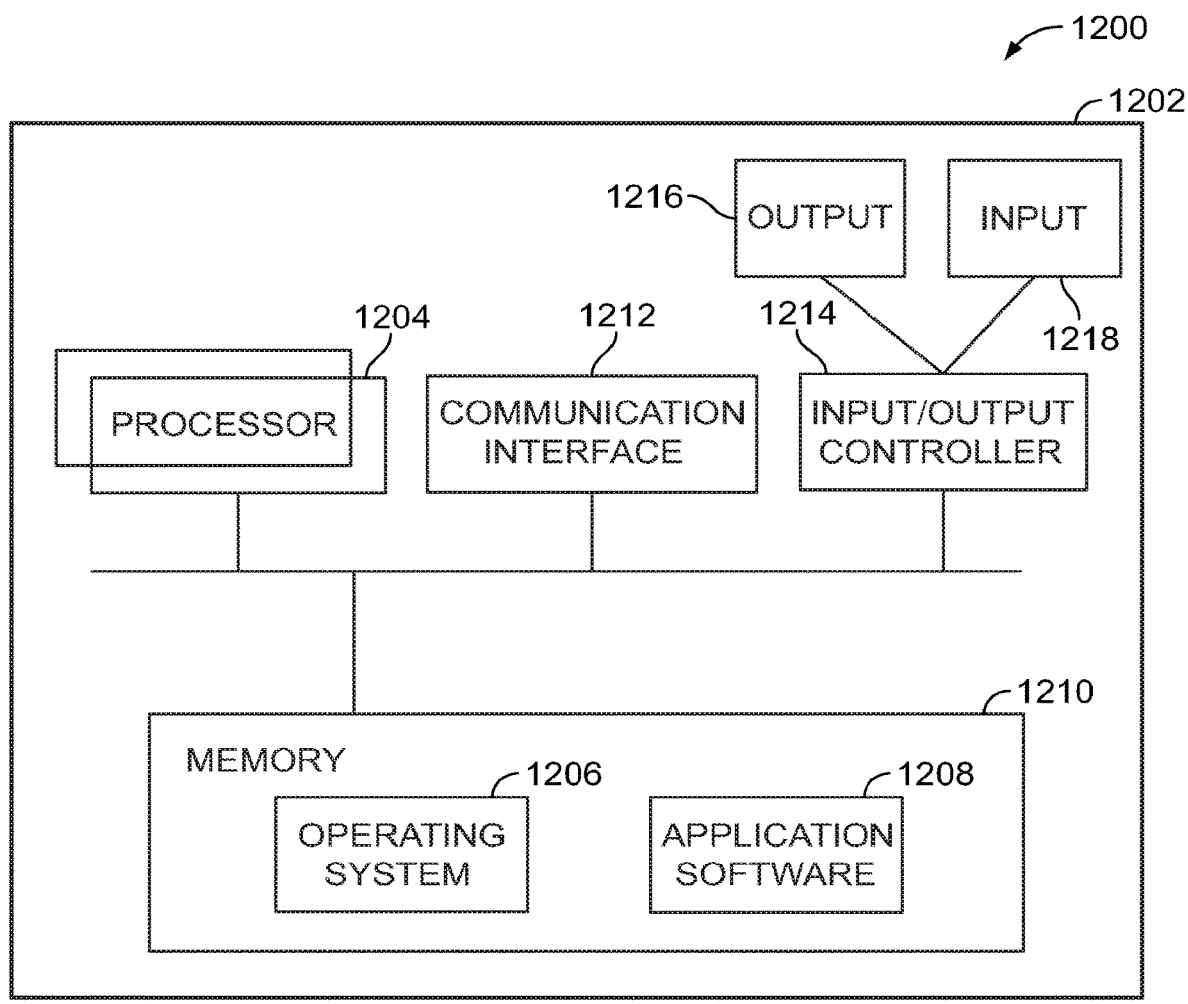
FIG. 13 is a functional block diagram illustrating a computing apparatus according to an example of the present disclosure.

The present disclosure is operable with a computing apparatus according to an implementation as a functional block diagram 1200 in FIG. 13. In such an implementation, components of a computing apparatus 1202 can be implemented as a part of an electronic device according to one or more implementations described in this specification. The computing apparatus 1202 comprises one or more processors 1204 which can be microprocessors, controllers or any other suitable type of processors for processing computer executable instructions to control the operation of the electronic device. Platform software comprising an operating system 1206 or any other suitable platform software can be provided on the apparatus 1202 to enable application software 1208 to be executed on the device. According to an implementation, the AM system as described herein can be implemented at least partially by software.

Computer executable instructions can be provided using any computer-readable media that are accessible by the computing apparatus 1202. Computer-readable media can include, without limitation, computer storage media such as a memory 1210 and communications media. Computer storage media, such as the memory 1210, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that is usable to store information for access by a computing apparatus. In contrast, communication media can embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 1210) is shown within the computing apparatus 1202, it will be appreciated by a person skilled in the art, that the storage can be distributed or located remotely and accessed via a network or other communication link (e.g., using a communication interface 1212).

The computing apparatus 1202 can comprise an input/output controller 1214 configured to output information to one or more output devices 1216, which in some implementations is a display or a speaker, and can be separate from or integral to the electronic device. The input/output controller 1214 can also be configured to receive and process an input from one or more input devices 1218, which in some implementations is a keyboard, a microphone or a touchpad. In one implementation, the output device 1216 also acts as the input device. A touch sensitive display is one such device. The input/output controller 1214 can also output data to devices other than the output device, e.g., a locally connected printing device. In some implementations, a user can provide input to the input device(s) 1216, 1218 and/or receive output from the output device(s) 1216.

The functionality described herein is performable, at least in part, by one or more hardware logic components. According to an implementation, the computing apparatus 1202 is configured by the program code when executed by the processor 1204 to execute the implementations of the operations and functionality described. Alternatively, or in addition, the functionality described herein is performable, at least in part, by one or more hardware logic components. Without limitation, illustrative types of hardware logic components that are usable include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Thus, various implementations include systems and methods for performing additive manufacturing.

While various spatial and directional terms, such as top, bottom, lower, mid, lateral, horizontal, vertical, front and the like may be used to describe the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Any range or value given herein is extendable or alterable without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as exemplary forms of implementing the claims.

It will be understood that the benefits and advantages described above can relate to one implementation or can relate to several implementations. The implementations are not limited to those that address every issue discussed in the Background herein or those that have any or all of the stated benefits and advantages.

The implementations illustrated and described herein as well as implementations not specifically described herein but within the scope of aspects of the claims constitute exemplary means for cold spray additive manufacturing with gas recovery.

The order of execution or performance of the operations in implementations of the disclosure illustrated and described herein is not essential, unless otherwise specified. That is, the operations can be performed in any order, unless otherwise specified, and examples of the disclosure can include additional or fewer operations than those disclosed herein. As an illustration, it is contemplated that executing or performing a particular operation before, contemporaneously with, or after another operation is within the scope of aspects of the disclosure.

When introducing elements of aspects of the disclosure or the implementations thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. As an illustration, the above-described implementations (and/or aspects thereof) are usable in combination with each other. In addition, many modifications are practicable to adapt a particular situation or material to the teachings of the various implementations of the disclosure without departing from their scope. While the dimensions and types of materials described herein are intended to define the parameters of the various implementations of the disclosure, the implementations are by no means limiting and are exemplary implementations. Many other implementations will be apparent to those of ordinary skill in the art upon reviewing the above description. The scope of the various implementations of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various implementations of the disclosure, including the best mode, and also to enable any person of ordinary skill in the art to practice the various implementations of the disclosure, including making and using any devices or systems and performing any incorporated methods. The patentable scope of the various implementations of the disclosure is defined by the claims, and includes other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

CLAUSES

The following clauses describe further aspects:

Clause Set A:

A1. A method for additively manufacturing an object, the method comprising:
applying heat to a first plurality of metallic particles in a powder bed using a first heat source, the first heat source being one of multiple heat sources configured into an array, the first heat source generating a first melt pool;
simultaneously applying heat to a second plurality of metallic particles in the powder bed using a second heat source of the multiple heat sources in the array to generate a second melt pool, the first plurality of metallic particles separated from the second plurality of metallic particles by a distance, the distance and an amount of heat from each heat source controlled to generate a combined melt pool that is larger in size and encompasses the first and second melt pools; and
allowing the combined melt pool to solidify to form the object.

A2. The method of clause A1, further comprising using additional heat sources in the array to generate corresponding additional melt pools with a corresponding change in size to the combined melt pool, the array configured in an (m×m) configuration or in an (n×m) configuration, where n is less than m.

A3. The method of any preceding clause, wherein the combined melt pool is sized according to a number of heat sources in the array applying heat.

A4. The method of any preceding clause, wherein using additional heat sources in the array to generate the combined melt pool comprises selectively controlling a number of the heat sources in the array that apply heat to enlarge and shape the combined melt pool.

A5. The method of any preceding clause, further comprising adjusting relative positions of the first heat source and the second heat source to adjust mechanical properties of the object formed from the combined melt pool.

A6. The method of any preceding clause, wherein applying heat comprises applying heat using a laser.

A7. The method of any preceding clause, further comprising moving the array relative to the powder bed in a first direction such that the combined melt pool moves across the powder bed in the first direction, as previous combined melt pool locations solidify.

A8. The method of any preceding clause, wherein applying heat to metallic particles comprises applying heat to particles of a titanium alloy.

A9. The method of any preceding clause, wherein applying heat further controlling the first and second heat sources to generate a plurality of heat spots having a defined diameter and a defined pitch.

A10. The method of any preceding clause, wherein the applying heat further comprises separating the first heat source and the second heat source, at the powder bed, by a distance corresponding to a spot size of the heat source at the powder bed.

Clause Set B:

B1. An additive manufacturing system comprising:
a powder bed configured to accept a coating of metallic particles; and
an array of heat sources comprising at least a first heat source and a second heat source, the first heat source configured to apply heat to a first plurality of adjacent metallic particles in the coating to generate a first melt pool, the second heat source configured to apply heat to a second plurality of adjacent metallic particles in the coating to generate a second melt pool, the first plurality of adjacent metallic particles separated from the second plurality of adjacent metallic particles by a distance, the distance and an amount of heat from each said heat source controlled to generate a combined melt pool that is larger in size and encompasses the first and second melt pools.

B2. The additive manufacturing system of clause B1, wherein the array of heat sources comprises an array of lasers, the array of lasers configured to generate a plurality of heat spots each having a defined diameter and a defined pitch.

B3. The additive manufacturing system of any preceding clause, wherein the array of heat sources is configured to move relative to the powder bed in a scanning direction.

B4. The additive manufacturing system of any preceding clause, wherein the array of heat sources is configured in an (m×m) configuration or in an (n×m) configuration, where n is less than m.

B5. The additive manufacturing system of any preceding clause, wherein the array of heat sources comprises a plurality of lasers, each of the lasers of the plurality of lasers having a mechanically adjustable position.

B6. The additive manufacturing system of any preceding clause, wherein the array of heat sources comprises columns of heat sources each controllable to apply heat at different temperatures.

B7. The additive manufacturing system of any preceding clause, wherein the array of heat sources is configured to generate a heat spot pattern, wherein at least one of a heat spot diameter or a heat spot pitch of the heat sport pattern is controllable to control a size of the combine melt pool.

B8. The additive manufacturing system of any preceding clause, wherein the array of heat sources comprises a plurality of lasers, each of the lasers of the plurality of lasers controllable to generate heat spots at different temperatures.

B9. The additive manufacturing system of any preceding clause, wherein the plurality of lasers are arranged in a plurality of columns, at least two of the columns having different numbers of lasers.

Clause Set C:

C1. One or more computer storage devices having computer-executable instructions stored thereon for operating heat sources during additive manufacturing, which, on execution by a computer, cause the computer to perform operations comprising:
applying heat to a first plurality of metallic particles in a powder bed using a first heat source, the first heat source being one of multiple heat sources configured into an array, the first heat source generating a first melt pool;
simultaneously applying heat to a second plurality of metallic particles in the powder bed using a second heat source of the multiple heat sources in the array to generate a second melt pool, the first plurality of metallic particles separated from the second plurality of metallic particles by a distance, the distance and an amount of heat from each heat source controlled to generate a combined melt pool that is larger in size and encompasses the first and second melt pools; and
allowing the combined melt pool to solidify to form the object.

What is claimed is:

1. An additive manufacturing system comprising:
a powder bed configured to accept a coating of metallic particles; and
an array of heat sources comprising at least a first heat source and a second heat source, the first heat source configured to apply heat to a first plurality of adjacent metallic particles in the coating to generate a first melt pool, the second heat source configured to simultaneously apply heat to a second plurality of adjacent metallic particles in the coating to generate a second melt pool, the first plurality of adjacent metallic particles separated from the second plurality of adjacent metallic particles by a distance, wherein the second melt pool is adjacent and parallel to the first melt pool, and the distance and an amount of heat from each said heat source is to be controlled to generate a combined melt pool that is larger in size and encompasses the first melt pool and the second melt pool.

2. The additive manufacturing system of claim 1, wherein the array of heat sources comprises an array of lasers, the array of lasers configured to generate a plurality of heat spots each having a defined diameter and a defined pitch.

3. The additive manufacturing system of claim 1, wherein the array of heat sources is configured to move relative to the powder bed in a scanning direction.

4. The additive manufacturing system of claim 1, wherein the array of heat sources is configured in an (m×m) configuration or in an (n×m) configuration, where n is less than m.

5. The additive manufacturing system of claim 1, wherein the array of heat sources comprises a plurality of lasers, each of the lasers of the plurality of lasers having a mechanically adjustable position.

6. The additive manufacturing system of claim 1, wherein the array of heat sources comprises columns of heat sources each controllable to apply heat at different temperatures.

7. The additive manufacturing system of claim 1, wherein the array of heat sources is configured to generate a heat spot pattern, wherein at least one of a heat spot diameter or a heat spot pitch of the heat spot pattern is controllable to control a size of the combine melt pool.

8. The additive manufacturing system of claim 1, wherein the array of heat sources comprises a plurality of lasers, each of the lasers of the plurality of lasers controllable to generate heat spots at different temperatures.

9. The additive manufacturing system of claim 8, wherein the plurality of lasers are arranged in a plurality of columns, at least two of the columns having different numbers of lasers.

10. The additive manufacturing system of claim 1, wherein the first heat source is a laser.

11. The additive manufacturing system of claim 1, wherein the second heat source is a laser.

12. The additive manufacturing system of claim 1, further comprising one or more optical components to apply heat to the first plurality of metallic particles to direct radiation from the heat source to a target location in a build space to build an object.

13. The additive manufacturing system of claim 1, further comprising one or more optical components to apply heat to the second plurality of metallic particles to direct radiation from the heat source to a target location in a build space to build an object.

14. The additive manufacturing system of claim 1, further comprising a powder delivery system for storing and delivering powder to a build space to build an object.

15. The additive manufacturing system of claim 14, further comprising a spreader to spread the powder to the build space.

16. The additive manufacturing system of claim 15, further comprising stock material supply to supply a raw material to an additive-manufacturing head.

17. The additive manufacturing system of claim 1, further comprising exposing at least a portion of a base alloy to multiple beams of focused energy from a heat source.

18. The additive manufacturing system of claim 1, wherein at least a portion of a base alloy are exposed to multiple beams of focused energy from the first heat source and the second heat source.

19. The additive manufacturing system of claim 1, wherein additional heat sources in the array of heat sources are used to generate corresponding additional melt pools with a corresponding change in size to the combined melt pool, the array configured in an (m×m) configuration or in an (n×m) configuration, where n is less than m.

20. One or more computer storage devices having computer-executable instructions stored thereon for operating heat sources during additive manufacturing, which, on execution by a computer, cause the computer to perform operations comprising:
  applying heat to a first plurality of metallic particles in a powder bed using a first heat source, the first heat source being one of multiple heat sources configured into an array, the first heat source generating a first melt pool;
  simultaneously applying heat to a second plurality of metallic particles in the powder bed using a second heat source of the multiple heat sources in the array to generate a second melt pool, the first plurality of metallic particles separated from the second plurality of metallic particles by a distance, the distance and an amount of heat from each heat source controlled to generate a combined melt pool that is larger in size and encompasses the first and second melt pools; and
  allowing the combined melt pool to solidify to form an object.

* * * * *